（12）United States Patent
Yamaoka

(10) Patent No.: US 11,813,684 B2
(45) Date of Patent: Nov. 14, 2023

(54) WIRE ELECTRICAL DISCHARGE MACHINE AND CONTROL METHOD

(71) Applicant: FANUC CORPORATION, Minamitsuru-gun (JP)

(72) Inventor: Masahide Yamaoka, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 536 days.

(21) Appl. No.: 16/942,129

(22) Filed: Jul. 29, 2020

(65) Prior Publication Data

US 2021/0031285 A1 Feb. 4, 2021

(30) Foreign Application Priority Data

Aug. 2, 2019 (JP) .................. 2019-143074

(51) Int. Cl.
*B23H 1/02* (2006.01)
*B23H 7/28* (2006.01)
(Continued)

(52) U.S. Cl.
CPC .............. *B23H 1/024* (2013.01); *B23H 7/28* (2013.01); *B23K 9/0953* (2013.01);
(Continued)

(58) Field of Classification Search
CPC ...... B23H 1/024; B23H 7/28; B23H 2500/20; B23K 9/0953; B23K 9/0956; B23K 9/30
See application file for complete search history.

(56) References Cited

U.S. PATENT DOCUMENTS 5,852,268 A 12/1998 Bühler et al.
9,969,020 B2 * 5/2018 Hasegawa ................ B23H 7/16
(Continued)

FOREIGN PATENT DOCUMENTS

JP H 06-277949 A 10/1994
JP 2002-239841 A 8/2002
(Continued)

OTHER PUBLICATIONS

Extended European Search Report dated Feb. 8, 2021 for European Patent Application No. 20188878.1-1017.
(Continued)

*Primary Examiner* — Brian W Jennison
(74) *Attorney, Agent, or Firm* — MCGINN I.P. LAW GROUP, PLLC

(57) ABSTRACT

A wire electrical discharge machine includes: a detection unit configured to detect a contact state in which the wire electrode contacts the workpiece, and a contact release state in which the wire electrode that is in the contact state is separated from the workpiece; a vibration unit configured to, if the contact state is detected during the machining of the workpiece, stop relative movement of the wire electrode and vibrate the wire electrode about a stop position at which the relative movement of the wire electrode has been stopped; and a relative movement control unit configured to resume relative movement of the wire electrode if the contact release state is detected until a predetermined time elapses from when the contact state has been detected or until the number of times that the wire electrode is vibrated reaches a predetermined number of times.

19 Claims, 5 Drawing Sheets

(51) Int. Cl.
  *B23K 9/095*    (2006.01)
  *B23K 9/30*     (2006.01)
(52) U.S. Cl.
  CPC ............ *B23K 9/0956* (2013.01); *B23K 9/30* (2013.01); *B23H 2500/20* (2013.01)

(56) References Cited

U.S. PATENT DOCUMENTS

| | | | |
|---|---|---|---|
| 11,504,785 B2* | 11/2022 | Yamaoka | B23H 1/10 |
| 2003/0010753 A1* | 1/2003 | Yamada | B23H 7/102 |
| | | | 219/69.12 |
| 2013/0220979 A1* | 8/2013 | Yamaoka | B23H 7/20 |
| | | | 219/69.12 |
| 2015/0231716 A1* | 8/2015 | Yamazaki | B23H 7/10 |
| | | | 219/69.12 |
| 2016/0045966 A1* | 2/2016 | Hasegawa | B23H 1/026 |
| | | | 219/69.12 |

FOREIGN PATENT DOCUMENTS

| | | | |
|---|---|---|---|
| JP | 2004-136386 A | 5/2004 |
| JP | 5361101 B2 | 12/2013 |
| JP | 2017-113820 A | 6/2017 |

OTHER PUBLICATIONS

Japanese Office Action dated Mar. 7, 2023 in corresponding Japanese Patent Application No. 2019-143074, with an English translation thereof.

* cited by examiner

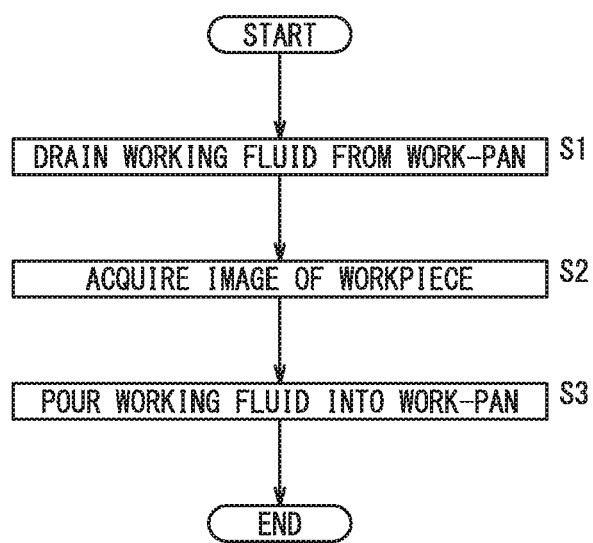

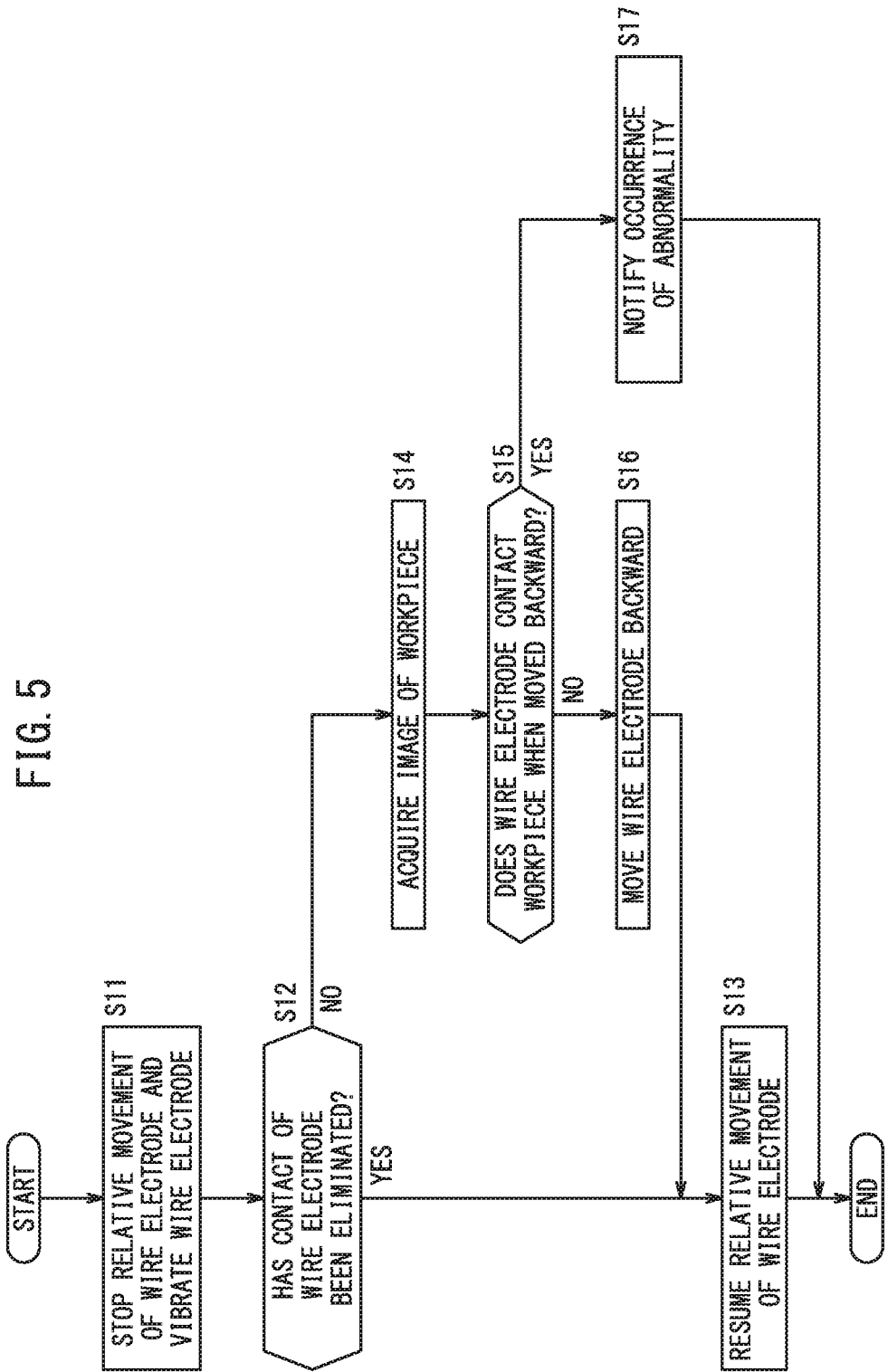

WIRE ELECTRICAL DISCHARGE MACHINE AND CONTROL METHOD

CROSS-REFERENCE TO RELATED APPLICATION

This application is based upon and claims the benefit of priority from Japanese Patent Application No. 2019-143074 filed on Aug. 2, 2019, the contents of which are incorporated herein by reference.

BACKGROUND OF THE INVENTION

Field of the Invention

The present invention relates to a wire electrical discharge machine that generates electrical discharge at an electrode gap between a workpiece and a wire electrode while moving the wire electrode relative to the workpiece to thereby machine the workpiece, as well as relating to a control method of the wire electrical discharge machine.

Description of the Related Art

In wire electrical discharge machines, there occur cases where a wire electrode contacts a workpiece during the machining of the workpiece, causing a short-circuit. Japanese Laid-Open Patent Publication No. 2004-136386 discloses a wire electrical discharge machine which, when occurrence of short-circuiting is detected, moves the wire electrode backward until no occurrence of a short-circuit is detected and then moves the wire electrode again toward the previous location.

SUMMARY OF THE INVENTION

Incidentally, during machining a workpiece, the workpiece may be distorted, and such distortion of the workpiece may cause a portion of the workpiece to enter a machining groove that has been formed in the workpiece by moving the wire electrode.

In the aforementioned Japanese Laid-Open Patent Publication No. 2004-136386, since the wire electrode is moved backward until no occurrence of a short-circuit is detected, there is a concern that the wire electrode that is moved backward comes into contact with the portion of the workpiece that have entered the machining groove to thereby cause a short-circuit again, resulting in a longer machining time.

It is therefore an object of the present invention to provide a wire electrical discharge machine and its control method that can implement smooth and efficient machining.

A first aspect of the present invention resides in a wire electrical discharge machine for machining a workpiece by generating electrical discharge at an electrode gap formed between the workpiece and a wire electrode while moving the wire electrode relative to the workpiece, including:

- a detection unit configured to detect a contact state in which the wire electrode contacts the workpiece, and a contact release state in which the wire electrode that is in the contact state is separated from the workpiece;
- a vibration unit configured to, if the contact state is detected during machining of the workpiece, stop the relative movement of the wire electrode and vibrate the wire electrode about a stop position at which the relative movement of the wire electrode has been stopped; and
- a relative movement control unit configured to resume relative movement of the wire electrode if the contact release state is detected until a predetermined time elapses from when the contact state has been detected or until the number of times that the wire electrode is vibrated reaches a predetermined number of times.

A second aspect of the present invention resides in a control method of a wire electrical discharge machine for machining a workpiece by generating electrical discharge at an electrode gap formed between the workpiece and a wire electrode while moving the wire electrode relative to the workpiece, including:

- a vibrating step of, if a contact state in which the wire electrode contacts the workpiece during machining of the workpiece is detected, stopping the relative movement of the wire electrode and vibrating the wire electrode about a stop position at which the relative movement of the wire electrode has been stopped; and
- a resuming step of resuming relative movement of the wire electrode if a contact release state in which the wire electrode that is in the contact state is separated from the workpiece is detected until a predetermined time elapses from when the contact state has been detected or until the number of times that the wire electrode is vibrated reaches a predetermined number of times.

According to the present invention, it is possible to eliminate a short-circuit without moving the wire electrode backward, hence implement smooth machining even if the workpiece is distorted such that part of the workpiece enter the machining groove.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a flowchart showing procedural steps of an image acquisition process; and FIG. 5 is a flowchart showing procedural steps of a control process after a contact of a wire electrode with a workpiece is detected during machining.

DESCRIPTION OF THE PREFERRED EMBODIMENTS

The present invention will be detailed below by describing a preferred embodiment with reference to the accompanying drawings.

Embodiment

Figure 1:
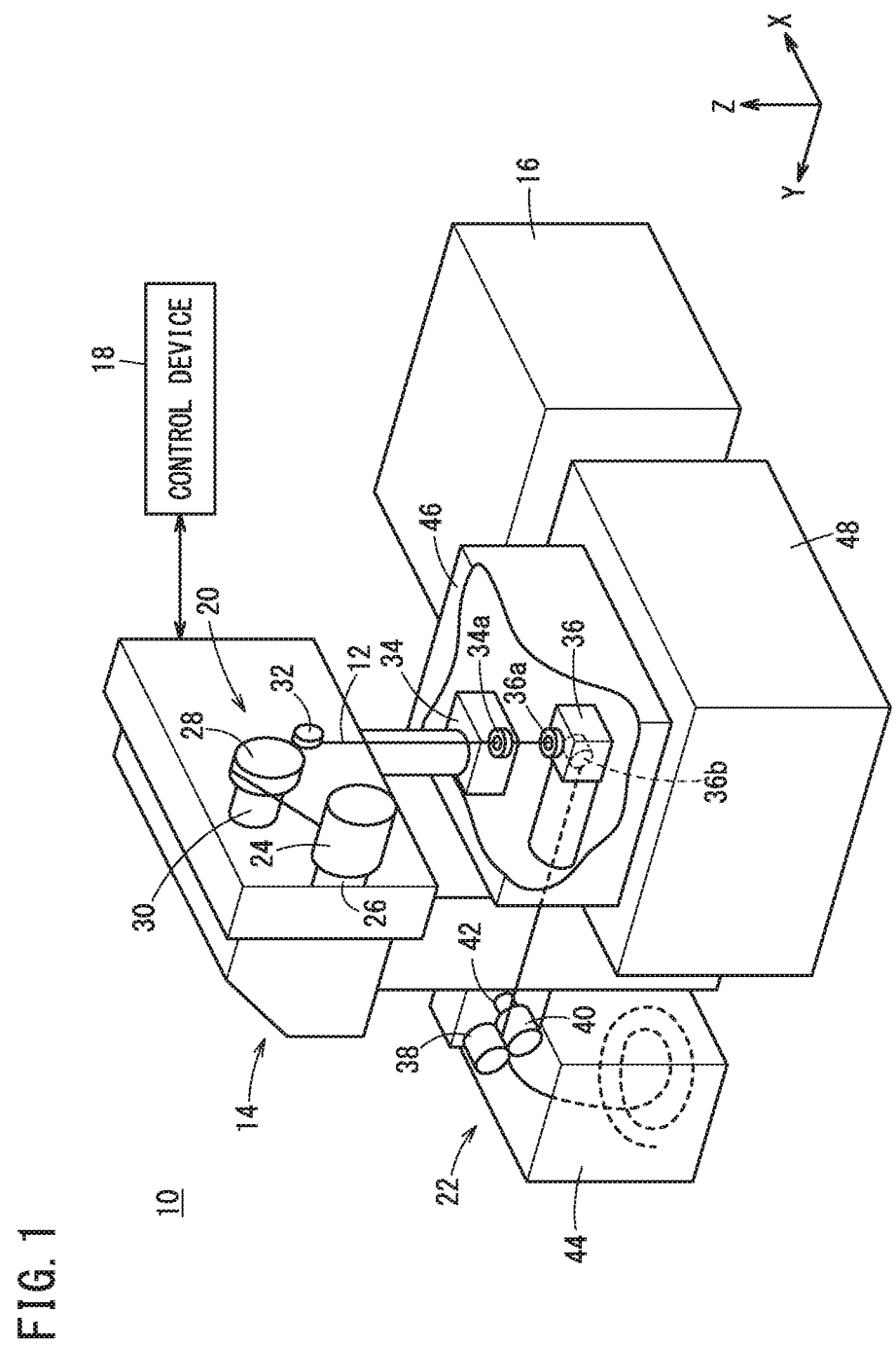
FIG. 1 is a schematic diagram showing a configuration of a wire electrical discharge machine according to an embodiment.

The overall configuration of a wire electrical discharge machine 10 will be described with reference to FIG. 1. In FIG. 1, the X-axis direction, Y-axis direction and Z-axis direction of the wire electrical discharge machine 10 are shown. Note that the X-axis direction and the Y-axis direction are orthogonal to each other on a plane, and the Z-axis direction is orthogonal to each of the X-axis direction and the Y-axis direction.

The wire electrical discharge machine 10 is a machine tool that generates electrical discharge at an electrode gap between the workpiece W and a wire electrode 12 in a dielectric working fluid by applying voltage to the electrode gap to thereby machine the workpiece W. The wire electrical discharge machine 10 includes a main machine body 14, a dielectric fluid unit 16, and a control device 18 for controlling the main machine body 14 and the dielectric fluid unit 16.

The wire electrode 12 is formed of, for example, metal material such as tungsten-based, copper alloy-based, or brass-based material. On the other hand, the workpiece W is formed of, for example, metal material such as iron-based material or superhard (tungsten carbide) material.

The main machine body 14 includes a supply system 20 that supplies the wire electrode 12 toward the workpiece W (workpiece, object to be machined), and a collecting system 22 that collects the wire electrode 12 that has passed through the workpiece W.

The supply system 20 includes a wire bobbin 24 on which a fresh wire electrode 12 is wound, a torque motor 26 that applies a torque to the wire bobbin 24, a brake shoe 28 for applying a braking force to the wire electrode 12 by friction, a brake motor 30 for applying a brake torque to the brake shoe 28, a tension detection unit 32 for detecting the magnitude of the tension of the wire electrode 12, and a die guide (upper die guide) 34 for guiding the wire electrode 12 at a position above the workpiece W.

The collecting system 22 includes a die guide (lower die guide) 36 for guiding the wire electrode 12 at a position below the workpiece W, a pinch roller 38 and a feed roller 40 capable of holding the wire electrode 12 therebetween, a torque motor 42 for applying a torque to the feed roller 40, and a collection box 44 for collecting the used wire electrode 12 conveyed by the pinch roller 38 and the feed roller 40.

The main machine body 14 includes a work-pan 46 capable of storing a dielectric working fluid. The dielectric working fluid is a liquid such as deionized water, oil, etc., used during machining. The work-pan 46 is mounted on a base 48. The die guides 34 and 36 are arranged in the work-pan 46, and the workpiece W is placed between the die guides 34 and 36. The die guides 34, 36, and the workpiece W are submerged in the working fluid stored in the work-pan 46.

The die guides 34 and 36 have respective support blocks 34a and 36a for supporting the wire electrode 12. The die guide 36 includes a guide roller 36b that changes the running direction of the wire electrode 12 and then guides the wire electrode 12 toward the pinch roller 38 and the feed roller 40.

The die guide 34 ejects a clean working fluid free from sludge (cutting chips) toward the electrode gap between the wire electrode 12 and the workpiece W. This makes it possible to fill the electrode gap with the clean fluid suitable for machining, and prevent a reduction in machining accuracy due to sludge generated during machining. The die guide 36 may also eject a clean working fluid free from sludge (cutting chips) toward the gap.

The dielectric fluid unit 16 is a device that removes sludge generated in the work-pan 46 and controls the liquid quality of the working fluid by adjusting electric resistivity, temperature and the like. The working fluid whose liquid quality is controlled by the dielectric fluid unit 16 is returned to the work-pan 46, and is ejected from at least the die guide 34.

Figure 2:
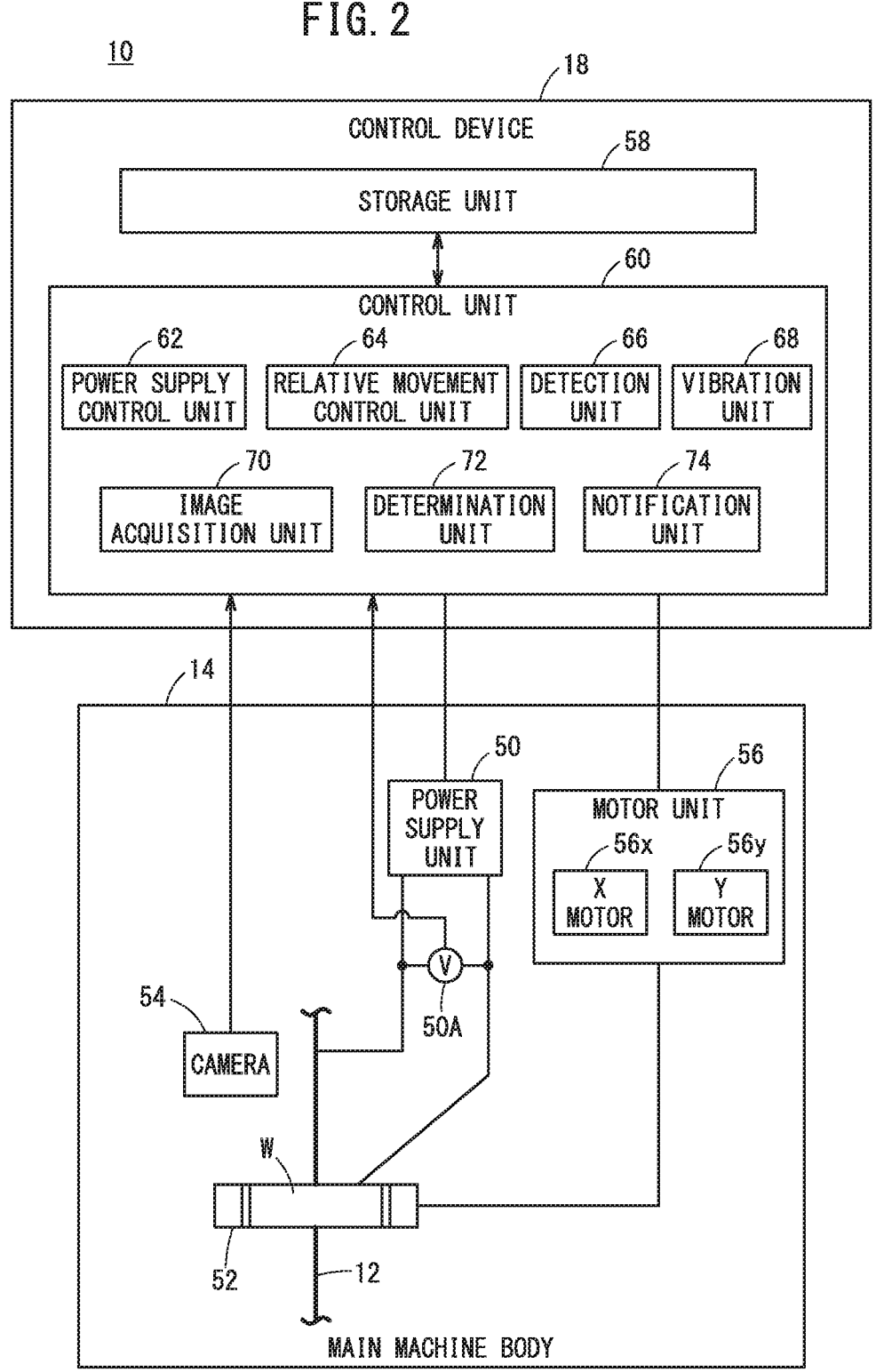
FIG. 2 is a schematic diagram showing a configuration of a machining control system of a wire electrical discharge machine.

Referring next to FIG. 2, the configuration of the machining control system of the wire electrical discharge machine 10 will be described. The main machine body 14 includes a power supply unit 50, a table 52, a camera 54, and a motor unit 56. Additionally, the control device 18 includes a storage unit 58 and a control unit 60.

The power supply unit 50 applies voltage to the electrode gap between the workpiece W and the wire electrode 12. The power supply unit 50 repeatedly applies a temporary voltage (voltage pulse) to the electrode gap between the workpiece W and the wire electrode 12 at a predetermined cycle. A voltage sensor 50A is provided across the electrode gap between the workpiece W and the wire electrode 12. The voltage sensor 50A detects the voltage applied to the electrode gap between the workpiece W and the wire electrode 12, and outputs the detected voltage to the control device 18. The voltage sensor 50A may be included in the power supply unit 50.

The table 52 is a table for fixing the workpiece W, and is arranged so as to be movable in the X-axis direction and the Y-axis direction. The workpiece W is fixed to the table 52 by a predetermined fixing jig. Therefore, the workpiece W moves integrally with the table 52.

The camera 54 captures an image of the workpiece W, and is arranged so as to be oriented in the direction in which the wire electrode 12 extends. The camera 54 may be provided on the die guide 34, i.e., on the feeding side of the wire electrode 12 to the workpiece W, or on the die guide 36, i.e., on the collecting side of the wire electrode 12 being fed to the workpiece W.

The motor unit 56 is a motor for creating relative movement between the wire electrode 12 and the workpiece W. In the present embodiment, the motor unit 56 includes an X motor 56x for moving the wire electrode 12 in the X-axis direction relative to the workpiece W and a Y motor 56y for moving the wire electrode 12 in the Y-axis direction relative to the workpiece W.

The X motor 56x moves the table 52 in the X-axis direction to create relative movement of the wire electrode 12 to the workpiece W in the X-axis direction. The X motor 56x may move the die guides 34 and 36 in the X-axis direction to create relative movement of the wire electrode 12 to the workpiece W. The Y motor 56y moves the table 52 in the Y-axis direction to create the relative movement of the wire electrode 12 to the workpiece W in the Y-axis direction. The Y motor 56y may move the die guides 34 and 36 in the Y-axis direction to create relative movement of the wire electrode 12 to the workpiece W.

The storage unit 58 is a storage medium capable of storing various pieces of information. The storage unit 58 stores at least a machining program and machining conditions for machining the workpiece W. The machining conditions are set according to the setting operation of the operator through an input unit of the control device 18. When the operator does not perform setting operation, the machining conditions preset as default are stored in the storage unit 58. The machining conditions include the voltage value of the voltage (pulse voltage) applied to the electrode gap between the workpiece W and the wire electrode 12, the interval (pulse interval) of the voltage (pulse voltage) repeatedly applied to the electrode gap, and the relative movement speed between the wire electrode 12 and the workpiece W.

Note that the pulse interval is a pause time during which no voltage (no pulse voltage) is applied to the electrode gap between the workpiece W and the wire electrode 12. The relative movement speed between the wire electrode 12 and the workpiece W is a speed at which the wire electrode 12 is moved relative to the workpiece W.

The control unit 60 controls the main machine body 14 and the dielectric fluid unit 16 based on the machining program and machining conditions stored in the storage unit 58. The control unit 60 may be a processor such as a CPU (Central Processing Unit) and an MPU (Micro Processing Unit). The control unit 60 includes a power supply control unit 62, a relative movement control unit 64, a detection unit 66, a vibration unit 68, an image acquisition unit 70, a determination unit 72, and a notification unit 74.

The power supply control unit 62 controls the power supply unit 50, based on the voltage value of the voltage (pulse voltage) and the interval (pulse interval) of the voltage (pulse voltage), stored in the storage unit 58, to thereby repeatedly apply a temporary voltage (pulse voltage) to the electrode gap between the workpiece W and the wire electrode 12 at a predetermined cycle.

The relative movement control unit 64 controls the motor unit 56 based on the relative movement speed stored in the storage unit 58 and the machining path specified by the machining program, to thereby move the wire electrode 12 relative to the workpiece W. The relative movement control unit 64 specifically controls the X motor 56x and the Y motor 56y of the motor unit 56, and moves the wire electrode 12 relative to the workpiece W in at least one of the X-axis direction and the Y-axis direction.

The detection unit 66 detects a contact state in which the wire electrode 12 contacts the workpiece W, and a contact release state in which the wire electrode 12 that is in the contact state is separated from the workpiece W. The detection unit 66 may detect the contact state and the contact release state using the voltage sensor 50A. Alternatively, the detection unit 66 may detect the contact state and the contact release state by using a current sensor that detects a current flowing through the electrode gap between the workpiece W and the wire electrode 12.

In this embodiment, the detection unit 66 detects the contact state and the contact release state by using the voltage sensor 50A. The detection unit 66 calculates (determines) the average of the voltage applied to the electrode gap between the workpiece W and the wire electrode 12 per unit time, for example, based on the voltage output from the voltage sensor 50A. The detection unit 66 determines the contact state if the calculated average voltage per unit time is less than a predetermined threshold. On the other hand, the detection unit 66 determines the contact release state if the average voltage per unit time is equal to or higher than the predetermined threshold.

Figure 3:
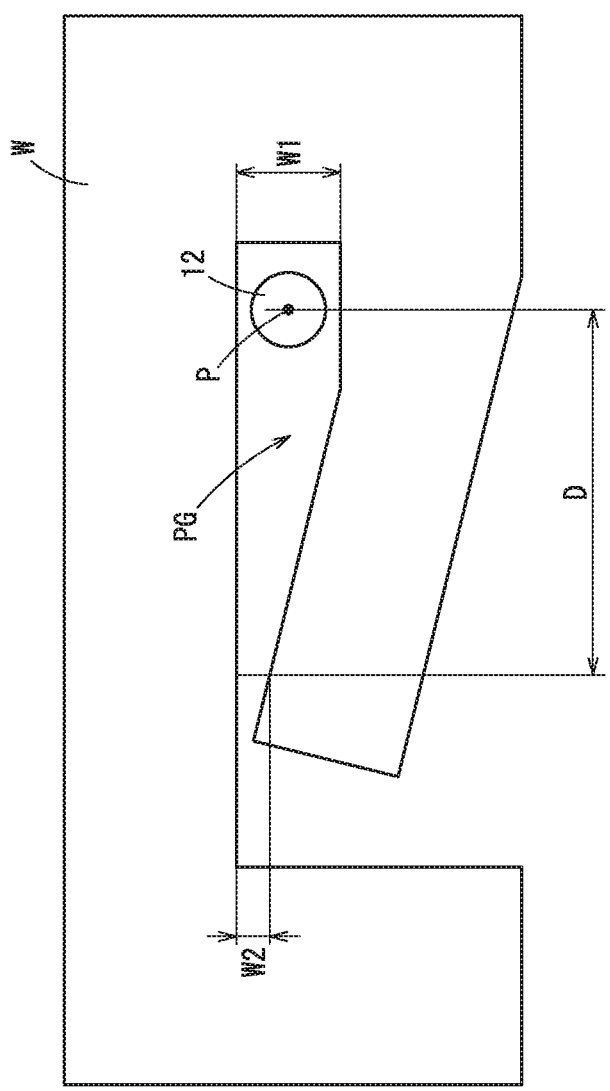
FIG. 3 is a diagram showing an image captured by a camera.

The vibration unit 68 stops the relative movement of the wire electrode 12 if the contact state is detected by the detection unit 66 during the machining of the workpiece W, and vibrates the wire electrode 12 about a stop position P (see FIG. 3) at which the relative movement of the wire electrode 12 has been stopped, i.e., with the stop position P serving as the reference point. The stop position P is the position of the wire electrode 12 represented in the coordinate system used by the control unit 60.

The vibration unit 68 may control the X motor 56x to vibrate the wire electrode 12 about the stop position P in the positive X-axis direction and negative X-axis direction (which will be hereinafter referred to as the first direction of vibration). The vibration unit 68 may control the Y motor 56y to vibrate the wire electrode 12 about the stop position P in the positive Y-axis direction and negative Y-axis direction (which will be hereinafter referred to as the second direction of vibration). The vibration unit 68 may control each of the torque motors 26 and 42 to vibrate the wire electrode 12 about the stop position P serving as the reference point in the positive Z-axis direction and negative Z-axis direction (which will be hereinafter referred to as the third direction of vibration). The vibration unit 68 may control the brake motor 30 and the like to change the tension of the wire electrode 12 to thereby vibrate the wire electrode 12. The vibration unit 68 may control a pump and the like provided in the dielectric fluid unit 16 to change at least the liquid pressure of the working fluid ejected from the die guide 34 to thereby vibrate the wire electrode 12.

The vibration unit 68 may generate vibration by combining at least two kinds of vibrations among the above described vibrations, including the vibration in the first direction, the vibration in the second direction, the vibration in the third direction, the vibration generated by changing the tension, and the vibration generated by changing the liquid pressure of the working fluid.

The image acquisition unit 70 acquires the image of the workpiece W from the camera 54. In the present embodiment, the image acquisition unit 70 acquires the image of the workpiece W that is machined in the working fluid stored in the work-pan 46, captured under such a condition that at least a surface of the workpiece W that faces the camera 54 is not submerged in the working fluid. The specific image acquisition process will be described later.

The determination unit 72 determines whether or not the wire electrode 12 can move backward from the stop position P of the wire electrode 12 at which the relative movement is stopped during the machining of the workpiece W. Next, the determination process of the determination unit 72 will be described with reference to FIG. 3. Here, FIG. 3 exemplifies an image acquired by the image acquisition unit 70.

In this embodiment, the determination unit 72, based on the image acquired by the image acquisition unit 70, determines whether or not the wire electrode 12 will contact the workpiece W when the wire electrode 12 is moved backward from the stop position P of the wire electrode 12 along a machining groove PG that has been machined in the workpiece W before the stoppage.

When a difference (W1−W2) obtained by subtracting, from the groove width W1 of the machining groove PG at the stop position P, the groove width W2 of the machining groove PG at a backward-moved position that is located a set distance D away from the stop position P is equal to or greater than a threshold, the determination unit 72 determines that the wire electrode 12 moved backward from the stop position P will contact the workpiece W. On the other hand, when the difference obtained by subtracting the groove width W2 from the groove width W1 is less than the threshold, the determination unit 72 determines that the wire electrode 12 moved backward from the stop position P will not contact the workpiece W.

Here, the distance D is a value that is set by the operator's setting operation or is set as a default in advance, similarly to the machining conditions. The groove widths W1 and W2 are the dimension of the machining groove PG in the direction orthogonal to the direction in which the wire electrode 12 extends and the backward movement direction in which the wire electrode 12 moves backward.

The notification unit 74 notifies a user or the like of occurrence of abnormality if the detection unit 66 does not detect the contact release state until a predetermined time elapses from when the detection unit 66 has detected the contact state during the machining of the workpiece W and if the determination unit 72 determines that the wire electrode 12 moved backward from the stop position P will contact the workpiece W.

When the control device 18 includes at least one of a display unit, a speaker, and a light emitter, the notification unit 74 may use at least one of the display unit, the speaker, and the light emitter, to notify the user of occurrence of abnormality. Alternatively, when an external device including at least one of a display unit, a speaker and a light emitter, is connected to the control device 18, the notification unit 74 may transmit an operation signal to the external device to thereby give notification of occurrence of abnormality.

Referring next to FIG. 4, the image acquisition process of the image acquisition unit 70 will be described.

The image acquisition unit 70 is triggered to start step S1 when the predetermined time elapses without a contact release state being detected by the detection unit 66 from when the detection unit 66 detected a contact state during the machining of the workpiece W.

At step S1, the image acquisition unit 70 drains the working fluid in the work-pan 46. Specifically, the image acquisition unit 70 opens a valve provided in a drain pipe that connects the dielectric fluid unit 16 and the work-pan 46 to thereby discharge a set amount of the working fluid from the work-pan 46, based on the a liquid flow sensor provided for the drain pipe. The set amount is an amount that causes such a state in which at least a surface of the workpiece W facing the camera 54 is not submerged in the working fluid, and the amount is designated by operator's setting operation or set as a default in advance. The image acquisition unit 70 closes the valve after draining the set amount of the working fluid from the work-pan 46, and the control proceeds to step S2.

At step S2, the image acquisition unit 70 controls the camera 54 to image the workpiece W including the wire electrode 12 located at the stop position P. When the image acquisition unit 70 acquires the image taken by the camera 54, the control proceeds to step S3.

At step S3, the image acquisition unit 70 pours the working fluid into the work-pan 46. Specifically, the image acquisition unit 70 opens a valve provided in a filling pipe that connects the dielectric fluid unit 16 and the work-pan 46, and pours a set amount of the working fluid from the dielectric fluid unit 16, based on a liquid flow sensor provided for the filling pipe. The image acquisition unit 70 closes the valve when the set amount of the working fluid has been poured from the dielectric fluid unit 16, and ends the image acquisition process.

Referring next to FIG. 5, the control process of the control unit 60 will be described. Specifically, description will be given on the control process that is executed by the control unit 60 after the detection unit 66 has detected a contact of the wire electrode 12 with the workpiece W during the machining.

That is, the control process proceeds to step S11 when a contact state has been detected by the detection unit 66 during the machining of the workpiece W.

At step S11, the vibration unit 68 stops the relative movement of the wire electrode 12, and vibrates the wire electrode 12 about the stop position P at which the relative movement of the wire electrode 12 has been stopped, i.e., with the stop position P serving as the reference point. When the vibration of the wire electrode 12 is started, the control process proceeds to step S12.

At step S12, the relative movement control unit 64 monitors whether or not a contact release state is detected by the detection unit 66 until a predetermined time elapses from when the contact state has been detected. Here, if a contact release state is detected until the predetermined time elapses from the time when the contact state has been detected, the control process proceeds to step S13. On the other hand, when no contact release state has been detected within the predetermined time from when the contact state was detected, the control process proceeds to step S14.

At step S13, the relative movement control unit 64 resumes relative movement of the wire electrode 12 from the stop position P at which the relative movement of the wire electrode 12 has been stopped. When relative movement of the wire electrode 12 is resumed, the control process ends.

At step S14, the image acquisition unit 70 executes the image acquisition process described above and obtains the image of the workpiece W including the wire electrode 12 located at the stop position P. When the image acquisition unit 70 obtains the image, the control process proceeds to step S15.

At step S15, the determination unit 72, based on the image obtained by the image acquisition unit 70, determines whether or not the wire electrode 12 will contact the workpiece W when the wire electrode 12 moves backward from the stop position P along the machining groove PG formed in the workpiece W before the stoppage.

Here, if the difference obtained by subtracting, from the groove width W1 at the stop position P, the groove width W2 at the backward-moved position located a set distance D apart from the stop position P is less than a threshold, the determination unit 72 determines that the wire electrode 12 moved backward from the stop position P will not contact the workpiece W. In this case, the control process goes to step S16. On the other hand, if the difference obtained by subtracting the groove width W2 from the groove width W1 is equal to or greater than the threshold, the determination unit 72 determines that the wire electrode 12 moved backward from the stop position P will contact the workpiece W. In this case, the control process goes to step S17.

At step S16, the relative movement control unit 64 relatively moves the wire electrode 12 so as to move backward along the machining groove PG to the backward-moved position, which is located the predetermined distance D backward from the stop position P. When the relative movement control unit 64 relatively moves the wire electrode 12 to the backward-moved position, the control process proceeds to step S13 and the relative movement control unit 64 resumes relative movement of the wire electrode 12 from the backward-moved position.

At step S17, the notification unit 74 notifies a user or the like that an abnormality has occurred. When the notification unit 74 finishes the notification, the control process ends.

MODIFICATIONS

The above embodiment may be modified as follows.

Modification 1

The relative movement control unit 64 may monitor whether or not the contact release state is detected until the number of times that the wire electrode 12 is vibrated reaches a predetermined number of times (step S12). If the contact release state is detected until the number of times of the vibrations reaches the predetermined number of times, the relative movement control unit 64 resumes relative movement of the wire electrode 12 (step S13). On the other hand, when no contact release state has been detected until the number of times of the vibrations reaches the predetermined number of times and when it is determined that the wire electrode 12 moved backward from the stop position P will not contact the workpiece W, the relative movement control unit 64 relatively moves the wire electrode 12 so as to move backward from the stop position P by the set distance along the machining groove PG (step S16).

Further, when no contact release state has been detected until the number of times of the vibrations reaches the predetermined number of times and when it is determined that the wire electrode 12 moved backward from the stop position P will contact the workpiece W, the notification unit 74 may give a notification of occurrence of abnormality (step S17).

When the wire electrode 12 is vibrated by moving the wire electrode 12 in the first direction of vibration, the number of times of vibrations is counted by regarding a round-trip motion of the wire electrode 12 under control of, for example, the X motor 56x, i.e., moving the wire electrode from the stop position P to a position that is located a predetermined distance away from the stop position P in the positive or negative X-axis direction and then returning to the stop position P, as one count. When the wire electrode 12 is vibrated by moving the wire electrode 12 in the second direction of vibration, the number of times of vibrations is counted by regarding a round-trip motion of the wire electrode 12 under control of, for example, the Y motor 56y, i.e., moving the wire electrode from the stop position P to a position that is located a predetermined distance apart from the stop position P in the positive or negative Y-axis direction and then returning to the stop position P, as one count. When the wire electrode 12 is vibrated by moving the wire electrode 12 in the third direction of vibration, the number of times of vibrations is counted by regarding a round-trip motion of the wire electrode 12 under control of, for example, the torque motors 26 and 42, moving the wire electrode from the stop position P to a position that is located a predetermined distance apart from the stop position P in the positive or negative Z-axis direction and then returning to the stop position P, as one count.

When the wire electrode 12 is vibrated by changing the tension applied to the wire electrode 12, the number of times of vibrations is counted by regarding a reciprocating change in tension under control of the brake motor 30 etc., i.e., changing the tension from a stopped state in which the wire electrode 12 is at the stop position P to a changed state in which the tension is changed from the stopped state and then returning to the stopped state, as one count. Further, when the wire electrode 12 is vibrated by changing the liquid pressure of the working fluid, the number of times of vibrations is counted by regarding a reciprocating change in liquid pressure under control of the pump or the like of the dielectric fluid unit 16, i.e., changing the liquid pressure from a stopped state in which the wire electrode 12 is at the stop position P to a changed state in which the liquid pressure is changed from the stopped state and then returning to the stopped state, as one count.

Modification 2

The determination unit 72 may determine whether or not the wire electrode 12 will contact the workpiece W when the wire electrode 12 moves backward from the stop position P along the machining groove PG formed in the workpiece W, based on the measurement result of a sensor measuring the machining groove PG formed in the workpiece W.

When determination is made based on the measurement result of a sensor, instead of the camera 54, a sensor such as a probe etc. that measures the distance to the machining groove PG can be provided in the die guide 34. Further, instead of the image acquisition unit 70, an acquisition unit that scans the die guide 34 to acquire the groove widths W1 and W2 based on the distance measured by the sensor is provided. This makes it possible to determine whether or not the wire electrode 12 moved backward from the stop position P along the machining groove PG will contact the workpiece W, as in the above embodiment.

Modification 3

The determination unit 72, based on a data table stored in the storage unit 58, may determine whether or not the wire electrode 12 will contact the workpiece W when moved backward from the stop position P along the machining groove PG formed in the workpiece W.

As the above data table, a table should be adopted in which, for example, at least the thickness of the workpiece W, the outer diameter of the wire electrode 12, the machining conditions, and the degree of distortion (strain) of the workpiece W predicted during machining are associated with each other. The thickness of the workpiece W is the dimension in a direction in which the wire electrode 12 extends, of the workpiece W fixed on the table 52.

The determination unit 72, by referring to the data table, recognizes the strain at the time when the detection unit 66 has detected a contact state during the machining of the workpiece W, and makes comparison with a threshold set for the strain. This makes it possible to determine whether or not the wire electrode 12 moved backward from the stop position P along the machining groove PG makes contact with the workpiece W.

Modification 4

The above-described embodiments and modifications may be arbitrarily combined as long as no technical inconsistency occurs.

Invention Obtained from Embodiments and Modifications

The inventions that can be grasped from the above-described embodiment and modifications are described below.

(First Invention)

The first invention is a wire electrical discharge machine (10) for machining a workpiece (W) by generating electrical discharge at an electrode gap formed between the workpiece (W) and a wire electrode (12) while moving the wire electrode (12) relative to the workpiece (W), including:

a detection unit (66) configured to detect a contact state in which the wire electrode (12) contacts the workpiece (W), and a contact release state in which the wire electrode (12) that is in the contact state is separated from the workpiece (W);

a vibration unit (68) configured to, if the contact state is detected during the machining of the workpiece (W), stop the relative movement of the wire electrode (12) and vibrate the wire electrode (12) about a stop position (P) at which the relative movement of the wire electrode (12) has been stopped; and, a relative movement control unit (64) configured to resume relative movement of the wire electrode (12) if the contact release state is detected until a predetermined time elapses from when the contact state has been detected or until the number of times that the wire electrode (12) is vibrated reaches a predetermined number of times.

With this configuration, a short-circuit can be eliminated without moving the wire electrode (12) backward. As a result, it is possible to achieve smooth machining even when the workpiece (W) is distorted such that a portion of the workpiece enters the machining groove (PG).

The wire electrical discharge machine (10) may further include a determination unit (72) configured to determine whether or not the wire electrode (12) will contact the workpiece (W) when the wire electrode (12) moves backward from the stop position (P) along a machining groove (PG) formed in the workpiece (W), and the relative movement control unit (64) may be configured to relatively move the wire electrode (12) so as to move backward by a set distance (D) from the stop position (P) along the machining groove (PG) if the contact release state is not detected until the predetermined time elapses from when the contact state has been detected or until the number of times that the wire electrode is vibrated reaches the predetermined number of times, and if it is determined that the wire electrode (12) will not contact the workpiece (W) when the wire electrode moves backward from the stop position (P). Owing thereto, it is possible to prevent backward movement of the wire electrode (12) when the workpiece (W) is distorted such that a portion of the workpiece enters the machining groove (PG).

The determination unit (72) may be configured to determine that the wire electrode (12) moved backward from the stop position (P) will contact the workpiece (W) if the difference obtained by subtracting, from the groove width (W1) of the machining groove (PG) at the stop position (P), the groove width (W2) of the machining groove (PG) at the backward-moved position that is located the set distance (D) away from the stop position (P) is equal to or greater than a threshold, and determine that the wire electrode (12) moved backward from the stop position (P) will not contact the workpiece (W) if the difference is less than the threshold. This configuration makes it possible to correctly determine whether or not the wire electrode (12) that is moved backward will contact the workpiece (W).

The determination unit (72) may be configured to determine whether or not the wire electrode (12) moved backward from the stop position (P) will contact the workpiece (W), based on the image taken by a camera (54) arranged so as to be oriented in the direction in which the wire electrode (12) extends. This configuration makes it possible to capture the actual machining condition, hence making it possible to correctly determine whether or not the wire electrode (12) that moves backward will contact the workpiece (W).

The determination unit (72) may be configured to determine whether or not the wire electrode (12) moved backward from the stop position (P) will contact the workpiece (W), based on the image of the workpiece (W) being machined in a liquid, captured under such a condition that at least a surface of the workpiece (W) that faces the camera (54) is not submerged in the liquid. This configuration enables capturing of a clear image of the actual machining condition, hence making it possible to correctly determine whether or not the wire electrode (12) that moves backward will contact the workpiece (W).

The wire electrical discharge machine (10) may further include a notification unit (74) configured to give notification of occurrence of abnormality if the contact release state is not detected until the predetermined time elapses from when the contact state has been detected or until the number of times that the wire electrode is vibrated reaches the predetermined number of times, and if it is determined that the wire electrode (12) moved backward from the stop position (P) will contact the workpiece (W). This configuration makes it possible to notify the operator of the fact that the abnormality cannot be automatically restored.

(Second Invention)

The second invention is a control method of a wire electrical discharge machine (10) for machining a workpiece (W) by generating electrical discharge at an electrode gap formed between the workpiece (W) and a wire electrode (12) while moving the wire electrode (12) relative to the workpiece (W), the method including:

a vibrating step (S11) of, if a contact state in which the wire electrode (12) contacts the workpiece (W) during machining of the workpiece is detected, stopping the relative movement of the wire electrode (12) and vibrating the wire electrode (12) about a stop position (P) at which the relative movement of the wire electrode (12) has been stopped; and a resuming step (S13) of resuming relative movement of the wire electrode (12) if a contact release state in which the wire electrode (12) that is in the contact state is separated from the workpiece (W) is detected until a predetermined time elapses from when the contact state has been detected or until the number of times that the wire electrode (12) is vibrated reaches a predetermined number of times.

With this configuration, a short-circuit can be eliminated without moving the wire electrode (12) backward. As a result, it is possible to achieve smooth machining even when the workpiece (W) is distorted such that a portion of the workpiece (W) enters the machining groove (PG).

The control method may further include a determining step (S15) of determining whether or not the wire electrode (12) will contact the workpiece (W) when the wire electrode (12) moves backward from the stop position (P) along a machining groove (PG) formed in the workpiece (W); and a moving-backward step (S16) of relatively moving the wire electrode (12) so as to move backward by a set distance (D) from the stop position (P) along the machining groove (PG) if the contact release state is not detected until the predetermined time elapses from when the contact state has been detected or until the number of times that the wire electrode is vibrated reaches the predetermined number of times, and if it is determined that the wire electrode (12) will not contact the workpiece (W) when the wire electrode moves backward from the stop position (P). Owing thereto, it is possible to prevent backward movement of the wire electrode (12) when the workpiece (W) is distorted such that a portion of the workpiece enters the machining groove (PG).

The determining step (S15) may determine that the wire electrode (12) moved backward from the stop position (P) will contact the workpiece (W) if the difference obtained by subtracting, from the groove width (W1) of the machining groove (PG) at the stop position (P), the groove width (W2) of the machining groove (PG) at the backward-moved position that is located the set distance (D) away from the stop position (P) is equal to or greater than a threshold, and determines that the wire electrode (12) moved backward from the stop position (P) will not contact the workpiece (W) if the difference is less than the threshold. This configuration makes it possible to correctly determine whether or not the wire electrode (12) that moves backward will contact the workpiece (W).

The determining step (S15) may determine whether or not the wire electrode (12) moved backward from the stop position (P) will contact the workpiece (W), based on the image captured by a camera (54) arranged so as to be oriented in the direction in which the wire electrode (12) extends. This configuration enables capture of the actual machining condition, hence making it possible to correctly determine whether or not the wire electrode (12) that moves backward will contact the workpiece (W).

The determining step (S15) may determine whether or not the wire electrode (12) moved backward from the stop position (P) will contact the workpiece (W), based on the image of the workpiece (W) being machined in a liquid, captured under such a condition that at least a surface of the workpiece (W) that faces the camera (54) is not submerged in the liquid. This configuration enables capture of a clear image of the actual machining condition, hence making it possible to correctly determine whether or not the wire electrode (12) that moves backward will contact the workpiece (W).

The control method may further includes a notifying step (S17) of giving notification of occurrence of abnormality if the contact release state is not detected until the predetermined time elapses from when the contact state has been detected or until the number of times that the wire electrode is vibrated reaches the predetermined number of times, and if it is determined that the wire electrode (12) moved backward from the stop position (P) will contact the workpiece (W). This configuration makes it possible to notify the operator of the fact that the abnormality cannot be automatically restored.

The present invention is not particularly limited to the embodiment described above, and various modifications are possible without departing from the essence and gist of the present invention.

What is claimed is:

1. A wire electrical discharge machine for machining a workpiece by generating electrical discharge at an electrode gap formed between the workpiece and a wire electrode while moving the wire electrode relative to the workpiece, comprising:
   a control unit including a processor; and
   a storage unit, the storage unit storing instructions to cause the processor to control:
      a detection unit for detecting a contact state in which the wire electrode contacts the workpiece, and a contact release state in which the wire electrode that is in the contact state is separated from the workpiece;
      a vibration unit for, if the contact state is detected during machining of the workpiece, stopping relative lateral movement of the wire electrode with respect to a Y-axis direction and an X-axis direction of the workpiece and vibrate the wire electrode about a stop position at which the relative lateral movement of the wire electrode has been stopped; and
      a relative movement control unit for resuming relative lateral movement of the wire electrode if the contact release state is detected until a predetermined time elapses from when the contact state has been detected or until a number of times that the wire electrode is vibrated reaches a predetermined number of times.

2. The wire electrical discharge machine according to claim 1, wherein the storage unit further stores instructions to cause the processor to control a determination unit for determining whether or not the wire electrode will contact the workpiece when the wire electrode moves backward from the stop position along a machining groove formed in the workpiece,
   wherein the relative movement control unit relatively moves the wire electrode so as to move backward by a set distance from the stop position along the machining groove if the contact release state is not detected until the predetermined time elapses from when the contact state has been detected or until the number of times that the wire electrode is vibrated reaches the predetermined number of times, and if it is determined that the wire electrode will not contact the workpiece when the wire electrode moves backward from the stop position.

3. The wire electrical discharge machine according to claim 2, wherein the determination unit determines that the wire electrode moved backward from the stop position will contact the workpiece if a difference obtained by subtracting, from a groove width of the machining groove at the stop position, a groove width of the machining groove at a backward-moved position that is located the set distance away from the stop position is equal to or greater than a threshold, and determine that the wire electrode moved backward from the stop position will not contact the workpiece if the difference is less than the threshold.

4. The wire electrical discharge machine according to claim 2, wherein the determination unit determines whether or not the wire electrode moved backward from the stop position will contact the workpiece, based on an image captured by a camera arranged so as to be oriented in a direction in which the wire electrode extends.

5. The wire electrical discharge machine according to claim 4, wherein the determination unit determines whether or not the wire electrode moved backward from the stop position will contact the workpiece, based on the image of the workpiece being machined in a liquid, captured under a condition that at least a surface of the workpiece that faces the camera is not submerged in the liquid.

6. The wire electrical discharge machine according to claim 2, wherein the storage unit further stores instructions to cause the processor to control a notification unit for giving notification of occurrence of abnormality if the contact release state is not detected until the predetermined time elapses from when the contact state has been detected or until the number of times that the wire electrode is vibrated reaches the predetermined number of times, and if it is determined that the wire electrode moved backward from the stop position will contact the workpiece.

7. A control method of a wire electrical discharge machine for machining a workpiece by generating electrical discharge at an electrode gap formed between the workpiece and a wire electrode while moving the wire electrode relative to the workpiece, comprising:
   if a contact state in which the wire electrode contacts the workpiece during machining of the workpiece is detected, stopping relative lateral movement of the wire electrode with respect to a Y-axis direction and an X-axis direction of the workpiece and vibrating the wire electrode about a stop position at which the relative lateral movement of the wire electrode has been stopped; and,
   resuming relative lateral movement of the wire electrode if a contact release state in which the wire electrode that is in the contact state is separated from the workpiece is detected until a predetermined time elapses from when the contact state has been detected or until a number of times that the wire electrode is vibrated reaches a predetermined number of times.

8. The control method according to claim 7, further comprising determining whether or not the wire electrode will contact the workpiece when the wire electrode moves backward from the stop position along a machining groove formed in the workpiece; and
    relatively moving the wire electrode so as to move backward by a set distance from the stop position along the machining groove if the contact release state is not detected until the predetermined time elapses from when the contact state has been detected or until the number of times that the wire electrode is vibrated reaches the predetermined number of times, and if it is determined that the wire electrode will not contact the workpiece when the wire electrode moves backward from the stop position.

9. The control method according to claim 8, wherein the determining determines that the wire electrode moved backward from the stop position will contact the workpiece if a difference obtained by subtracting, from a groove width of the machining groove at the stop position, a groove width of the machining groove at a backward-moved position that is located the set distance away from the stop position is equal to or greater than a threshold, and determines that the wire electrode moved backward from the stop position will not contact the workpiece W if the difference is less than the threshold.

10. The control method according to claim 8, wherein the determining determines whether or not the wire electrode moved backward from the stop position will contact the workpiece, based on an image captured by a camera arranged so as to be oriented in a direction in which the wire electrode extends.

11. The control method according to claim 10, wherein the determining determines whether or not the wire electrode moved backward from the stop position will contact the workpiece, based on the image of the workpiece being machined in a liquid, captured under a condition that at least a surface of the workpiece that faces the camera is not submerged in the liquid.

12. The control method according to claim 8, further comprising giving notification of occurrence of abnormality if the contact release state is not detected until the predetermined time elapses from when the contact state has been detected or until the number of times that the wire electrode is vibrated reaches the predetermined number of times, and if it is determined that the wire electrode moved backward from the stop position will contact the workpiece.

13. The wire electrical discharge machine according to claim 1, wherein the detection unit determines, via a voltage sensor, an average of a voltage applied to the electrode gap between the workpiece and the wire electrode per unit time based on the voltage output from the voltage sensor, and
    wherein the detection unit determines the contact state based on the calculated average voltage per unit time being less than a predetermined threshold.

14. The wire electrical discharge machine according to claim 1, wherein the vibration unit vibrates the wire electrode about the stop position in first directions including a positive X-axis direction and a negative X-axis direction,
    wherein the vibration unit vibrates the wire electrode about the stop position in second directions including a positive Y-axis direction and a negative Y-axis direction, and
    wherein the vibration unit vibrates the wire electrode about the stop position in third directions including a positive Z-axis direction in a Z-axis and a negative Z-axis direction in the Z-axis.

15. The wire electrical discharge machine according to claim 14, wherein the vibration unit vibrates the wire electrode in at least two of the first directions, the second directions, and the third directions.

16. The wire electrical discharge machine according to claim 2, wherein the detection unit determines, via a voltage sensor, an average of a voltage applied to the electrode gap between the workpiece and the wire electrode per unit time based on the voltage output from the voltage sensor, and
    wherein the detection unit determines the contact state based on the calculated average voltage per unit time being less than a predetermined threshold.

17. The wire electrical discharge machine according to claim 2, wherein the vibration unit vibrates the wire electrode about the stop position in first directions including a positive X-axis direction and a negative X-axis direction,
    wherein the vibration unit vibrates the wire electrode about the stop position in second directions including a positive Y-axis direction and a negative Y-axis direction, and
    wherein the vibration unit vibrates the wire electrode about the stop position in third directions including a positive Z-axis direction in a Z-axis and a negative Z-axis direction in the Z-axis.

18. The wire electrical discharge machine according to claim 17, wherein the vibration unit vibrates the wire electrode in at least two of the first directions, the second directions, and the third directions.

19. A wire electrical discharge machine for machining a workpiece by generating electrical discharge at an electrode gap formed between the workpiece and a wire electrode while moving the wire electrode relative to the workpiece, comprising:
    a control unit including a processor; and
    a storage unit, the storage unit storing instructions to cause the processor to control:
        a detection unit for detecting a contact state in which the wire electrode contacts the workpiece, and a contact release state in which the wire electrode that is in the contact state is separated from the workpiece;
        a vibration unit for, if the contact state is detected during machining of the workpiece, stopping relative movement of the wire electrode and vibrate the wire electrode about a stop position at which the relative movement of the wire electrode has been stopped;
        a relative movement control unit for resuming relative movement of the wire electrode if the contact release state is detected until a predetermined time elapses from when the contact state has been detected or until a number of times that the wire electrode is vibrated reaches a predetermined number of times; and
        a determination unit for determining whether or not the wire electrode will contact the workpiece when the wire electrode moves backward from the stop position along a machining groove formed in the workpiece,
    wherein the relative movement control unit relatively moves the wire electrode so as to move backward by a set distance from the stop position along the machining groove if the contact release state is not detected until the predetermined time elapses from when the contact state has been detected or until the number of times that the wire electrode is vibrated reaches the predetermined number of times, and if it is determined that the wire electrode will not contact the workpiece when the wire electrode moves backward from the stop position.

\* \* \* \* \*